United States Patent [19]

Reüsche et al.

[11] 3,759,975
[45] Sept. 18, 1973

[54] DICHLOROMETHYLENE CARBAMIC ACID ESTERS AND THIOESTERS

[75] Inventors: Wolfgang Reüsche, Leverkusen-Schlebusch; Hans Holtschmidt, Leverkusen-Steinbuchel, both of Germany

[73] Assignee: Bayer Aktiengesellschaft, Leverkusen, Germany

[22] Filed: Dec. 12, 1969

[21] Appl. No.: 884,717

[30] Foreign Application Priority Data
Jan. 8, 1969   Germany................. P 19 00 755.7

[52] U.S. Cl............ 260/465 D, 71/106, 260/455 A, 260/465.4, 260/479 C, 260/482 B, 260/482 C, 424/300

[51] Int. Cl.......................................... C02c 125/06

[58] Field of Search.................... 260/482 C, 465 D

[56] References Cited
OTHER PUBLICATIONS

Neidlein, R. et al. Chem. Ber. 99(1) (1966).
Szmank, H. H. Organic Chem. (pg. 242) 1957.

*Primary Examiner*—Lorraine A. Weinberger
*Assistant Examiner*—Paul J. Killos
*Attorney*—Burgess, Dinklage and Sprung

[57] ABSTRACT

Dichloromethylenecarbonic acid esters and -thioesters are obtained by reacting dichloromethylenecarbamic acid chloride with alcohols, thioalcohols, phenols or thiophenols at a temperature range of from −50° to + 100° C. The compounds obtained by this process show pesticidal activity. They can, furthermore, be used for the preparation of the corresponding isocyanates.

5 Claims, No Drawings

DICHLOROMETHYLENE CARBAMIC ACID ESTERS AND THIOESTERS

This invention relates to dichloromethylene carbamic acid esters and thioesters and to a process for their production.

The compounds obtained in accordance with the invention correspond to the general formula

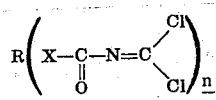

in which R represents an n-valent, optionally substituted, aliphatic, araliphatic or aromatic radical. X represents oxygen or sulphur, and n represents an integer from 1 to 6 (preferably from 1 to 3), except that R cannot represent ethyl when X represents oxygen, and n stands for one.

More particularly, R can represent a saturated or optionally unsaturated aliphatic radical with from 1 to 24, preferably 1 to 18, especially 1 to 8 and 3 to 8 carbon atoms, which may be substituted by atoms or radicals that are inert under the conditions under which these compounds are prepared. Examples of substituents such as these include one or more halogen (preferably fluor, chlor, brom) atoms and/or, aryl (preferably phenyl), alkoxy (preferably 1 to 4 carbon atoms), aroxy (preferably phenoxy), acyl (preferably lower aliphatic carbonic acid radicals C 1 - 6), acylamino (Acyl C 1 - 6), arylmercapto (preferably phenylmercapto), alkylmercapto (preferably C 1 - 4), nitro, cyano, azido or sulphonyl radicals. R can also represent the radical of a (polymeric) compound with a molecular weight of from 800 to 3,000 containing ester and/or ether and/or thioether groups.

The aryl (preferably such having up to 14 C atoms in the ring system, especially phenyl and naphthyl) and araliphatic(phenylethyl, preferably benzyl) radicals may be substituted as mentioned above for the alkyl radical.

The invention also provides a process for preparing dichloromethylene carbamic acid esters which comprises reacting dichloromethylene carbamic acid chloride with an alcohol, thioalcohol, phenol or thiophenol at a temperature of from −50° to +100° C, optionally in an inert solvent.

The chlorine atoms of isocyanide dichlorides, acyl isocyanide dichlorides in particular, are known to react with alcohols and thioalcohols under moderate conditions under which the chlorine atoms of the carbamic acid chlorides are also highly reactive. Accordingly, the three chlorine atoms of dichloromethylene carbamic acid chloride would be expected to react with alcohols and thioalcohols at substantially the same velocity. It has surprisingly been found, however, that the chlorine atom of the carboxylic acid chloride group can be selectively reacted in a smooth reaction to form the required dichloromethylene carbamic acid esters.

Dichloromethylene carbamic acid chloride is a known compound. Suitable starting materials for the process include compounds of the general formula R (XH)$_n$ Wherein R represents an n-valent, optionally substituted, saturated or unsaturated, aliphatic, araliphatic or aromatic radical, X represents oxygen or sulphur, and n represents an integer from 1 to 6. Examples of such compounds include monohydric and polyhydric, aliphatic alcohols and thioalcohols with from 1 to 18 carbon atoms, for example methanol, ethanol, isopropanol, n-butanol, isobutanol, decanols, stearyl alcohol, benzyl alcohol, allyl alcohol, propargyl alcohol, 2-methoxyethanol, cyclohexanol, decalols, ethylene glycol, diethylene glycol, diethylene glycol monomethyl ether, propylene glycols, 1,4-butane diol, 2-butene-1,4-diol, 2-butine-1, 4-diol, hexane-1,6-diol, thiodiglycol, glycerol, trimethylol propane, pentaerythritol, methyl mercaptan, butyl mercaptan, dodecyl mercaptan, stearylmercaptan, 2-mercaptoethanol, sorbitol, and mannitol.

Further starting materials are phenoles and thiophenoles such as phenole, cresoles, chlorophenoles nitrophenoles, anisoles, hydroxyacetophenone, 2,2-bis-(4-hydroxyphenyl)-propane, 4,4'-dihydroxydiphenylsulphone, naphtoles, hydroxyanthracenes, dihydroxybenzoles, -naphtaline and -anthracenes, thiophenole.

Furthermore as starting materials compounds containing hydroxy- or thiol groups can be used which are built up from polyethers, polyesters, polythioethers, polyetherpolyesters or polyetherpolythioethers with a molecular weight of from 800 to 3,000.

The starting materials are named in the following XH-compounds.

The process of the invention can be carried out in the temperature range of from −50° to + 100° C. Preferably the reaction is carried out at 0° and + 40° C, especially the reaction is started at 10° to 20° C and afterwards during the reaction the temperature is raised up to 40° to 50° C.

Suitable solvents for this process are indifferent unhydrous organic solvents, i.e.: ethers as diethyl ether, dioxan, tetrahydrofuran and aliphatic and aromatic, optionally halogenated hydrocarbons as for instance benzol, toluol, benzene, chlorobenzol, chloroform and tetrachlorocarbon.

Generally, the process is carried out in such a manner that the dichloromethylene carbamic acid chloride is dissolved in the solvent and the XH-compound is slowly added under cooling. After completion of the reaction the formed dichloromethylene carbamic acid ester, or thioester, is isolated from the resulting solution, for instance by destillation or crystallization. It is of course also possible to change the order of adding the reactants.

To obtain high yields, from 0.5 to 2 mols of dichloromethylene carbamic acid chloride are used per equivalent of the (-XH)-compound. The two reactants are preferably used in a ratio of from 0.8 to 1.2:1.

The following compounds in particular can be obtained by the process according to the invention:

Dichloromethylene carbamic acid methyl ester; dichloromethylene carbamic acid ethyl ester (this compound is known); dichloromethylene carbamic acid t-butyl ester; dichloromethylene carbamic acid n-butyl thio ester; bis-(dichloromethylene-carbamic acid)-butylene-1,4-ester; and dichloromethylene-carbamic acid phenyl ester and phenyl thio ester.

The compounds obtained by the process are liquid or solid compounds. They show pesticidal activity and may be used, for example, as herbicides, fungicides and acaricides. In addition they can be reacted by known methods like isocyanide dichlorides and may be used for example to produce the corresponding isocyanates.

For instance, 134 g (1.39 mols) of anhydrous methyl sulphonic acid are added dropwise at around 20° C to 208 g (1.34 mols) of dichloromethylene carbamic acid methyl ester in such a way that the internal temperature rises to 50° C. The hydrogen chloride bound in the form of carbamic acid chloride is then removed through a column over a period of 5 hours during which the sump temperature gradually rises, and the product is worked up in the usual way. N-methoxycarbonyl isocyanate of b.p. 95°–97° C/760 Torr is obtained in a yield of 99 g (73 percent of the theoretical).

The other new compounds that can be obtained by the process according to the invention can also be similarly converted into the corresponding isocyanates.

EXAMPLE 1

86.5 (1.88 mols) of absolute ethanol are added with thorough cooling and stirring over a period of 80 minutes to a solution of 300 g of dichloromethylene carbamic acid chloride (1.88 mols) in 350 ml. of ether (dried over sodium) [reaction temperature from 15° to 20° C ]. The solution is kept at room temperature for 2 hours, the ether is distilled off and the product is rectified. The main fraction of 267 g (84 percent of the theoretical)[b.p. 2055°–68° C] is redistilled through a column giving 230 g (72 percent of the theoretical) of dichloromethylene carbamic acid ethyl ester, b.p. 68° C./20 Torr.

EXAMPLE 2

The procedure is as in Example 1 except that the ethanol is replaced by 60 g of methanol. Dichloromethylene carbamic acid methyl ester is obtained in a yield of 205 g (b.p. 97° C/760 Torr).

EXAMPLE 3

The procedure is as described in Example 1, except that the ethanol is replaced by 139 g of t-butanol. Dichloromethylene carbamic acid t-butyl ester is obtained in a yield of 264 g (b.p. 75° C/15 Torr).

EXAMPLE 4

90 g (1 mol) of n-butyl mercaptan and 160.5 g (1 mol) of dichloromethylene carbamic acid chloride are reacted in ether as described in Example 1. Dichloromethylene carbamic acid n-butyl thioester. having the formula

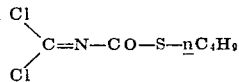

is obtained in the form of a colourless oil of b.p. 118° C/11 Torr. in a yield of 170 g (79.5 percent of the theoretical). In an analogous manner the corresponding esters and thioesters are obtainable when hydroxy- or thio-compounds of the formula R(XH)$_n$ are used, especially those mentioned on page 4.

What we claim is:

1. Process for preparing dichloromethylene carbamic acid esters which comprises reacting dichloromethylene carbamic acid chloride with a compound of the formula R(XH)$_n$ wherein $n$ is an integer of from 1 to 6 inclusive;
X is oxygen; and
R is selected from the group of n-valent aliphatic radicals having up to 24 carbon atoms, phenylethyl, benzyl and phenyl radicals and any of the foregoing substituted with a substituent selected from the group of halo, lower alkoxy, lower alkyl mercapto, phenylmercapto, nitro, cyano.

2. Process for preparing dichloromethylene carbamic acid esters which comprises reacting at a temperature of from −50° to +100° C. dichloromethylene carbamic acid chloride with a compound of the formula R(OH)$_n$ wherein $n$ is an integer of from 1 to 6 inclusive; and
R is selected from the group of n-valent aliphatic radicals having up to 24 carbon atoms, and the foregoing substituted with a substituent selected from the group of halo, lower alkoxy, lower alkyl mercapto, phenylmercapto, nitro, cyano.

3. Process as claimed in claim 2 wherein the reaction is carried out in an inert solvent.

4. Process as claimed in claim 2 wherein from 0.5 to 2 mols of dichloromethylene carbamic acid chloride are used per equivalent of said compound.

5. Process as claimed in claim 2 wherein the molar ratio of dichloromethylene carbamic acid chloride to said compound is in the range of from 0.8:1 to 1.2:1.

* * * * *